US007383733B2

(12) United States Patent
Mosely et al.

(10) Patent No.: US 7,383,733 B2
(45) Date of Patent: Jun. 10, 2008

(54) METHOD AND APPARATUS FOR THE SONIC DETECTION OF HIGH PRESSURE CONDITIONS IN A VACUUM SWITCHING DEVICE

(75) Inventors: Roderick C. Mosely, Pleasanton, CA (US); Steven Jay Randazzo, San Jose, CA (US); Li Lei, Mountain View, CA (US); Ernest Frederick Bestel, Mint Hill, NC (US)

(73) Assignee: Jennings Technology, San Jose, CA (US)

( * ) Notice: Subject to any disclaimer, the term of this patent is extended or adjusted under 35 U.S.C. 154(b) by 0 days.

(21) Appl. No.: 11/241,087

(22) Filed: Sep. 30, 2005

(65) Prior Publication Data

US 2007/0089521 A1 Apr. 26, 2007

(51) Int. Cl.
*G01N 29/10* (2006.01)

(52) U.S. Cl. ............................ 73/602; 73/614; 73/629

(58) Field of Classification Search .................... 73/40, 73/40.5 A, 42.9, 49.2, 49.3, 24.01, 24.06, 73/52, 592, 596, 602, 597, 598, 599, 600, 73/610, 614, 627, 628, 629
See application file for complete search history.

(56) References Cited

U.S. PATENT DOCUMENTS 3,583,213 A 6/1971 Houck
3,983,345 A 9/1976 Phillips
4,103,291 A * 7/1978 Howe et al. ................ 340/522
4,138,894 A * 2/1979 Robert et al. ................. 73/625
4,163,130 A 7/1979 Kubota et al.
4,208,917 A * 6/1980 Aoyama et al. .............. 73/644
4,223,790 A 9/1980 Yoshida
4,270,091 A 5/1981 Mann
4,295,566 A 10/1981 Vincek
4,320,659 A 3/1982 Lynnworth et al.
4,402,224 A 9/1983 Fukushima
4,403,124 A 9/1983 Perkins et al.
4,440,995 A * 4/1984 Lange et al. ................ 218/122
4,484,818 A 11/1984 Houston
4,491,704 A 1/1985 Milianowicz et al.
4,513,208 A 4/1985 Kamata
4,547,769 A 10/1985 Tanigaki et al.
4,574,615 A 3/1986 Bower et al.
4,635,042 A 1/1987 Andrews
4,738,137 A 4/1988 Sugg et al.
4,877,143 A 10/1989 Travisano (Continued)

FOREIGN PATENT DOCUMENTS

DE 19526394 1/1997

(Continued)

*Primary Examiner*—Hezron Williams
*Assistant Examiner*—Jacques M. Saint-Surin
(74) *Attorney, Agent, or Firm*—Hickman Palermo Truong & Becker LLP; Edward A. Becker

(57) ABSTRACT

A method and apparatus for detecting a high pressure condition within an interrupter includes introducing high intensity ultrasonic sound into the outer wall of a vacuum interrupter through a sonic wave guide, then listening for the reflected and retransmitted response signals. The characteristics of the response signals are utilized to determine the pressure within the interrupter, and to determine when an unwanted high pressure condition exists.

37 Claims, 16 Drawing Sheets

U.S. PATENT DOCUMENTS

| | | | | |
|---|---|---|---|---|
| 4,937,698 | A | 6/1990 | Toya et al. | |
| 5,159,838 | A * | 11/1992 | Lynnworth | 73/644 |
| 5,286,933 | A | 2/1994 | Pham | |
| 5,289,929 | A | 3/1994 | Heilman et al. | |
| 5,392,635 | A | 2/1995 | Cadel et al. | |
| 5,501,098 | A | 3/1996 | Cadel et al. | |
| 5,542,298 | A | 8/1996 | Sarvasian et al. | |
| 5,551,285 | A | 9/1996 | Gannon et al. | |
| 5,625,140 | A | 4/1997 | Cadet et al. | |
| 5,675,074 | A | 10/1997 | Melvin, II | |
| 5,693,881 | A | 12/1997 | Stachitt | |
| 5,739,418 | A | 4/1998 | Hackel et al. | |
| 5,739,419 | A | 4/1998 | Maier et al. | |
| 6,418,791 | B1 * | 7/2002 | Lanni et al. | 73/602 |
| 6,429,575 | B1 * | 8/2002 | Abramov et al. | 310/337 |
| 6,659,037 | B2 | 12/2003 | Hagopian | |
| 7,302,854 | B2 * | 12/2007 | Egermeier et al. | 73/729.1 |
| 7,313,964 | B2 * | 1/2008 | Montesclaros et al. | 73/700 |
| 2005/0031499 | A1 * | 2/2005 | Meier | 422/128 |

FOREIGN PATENT DOCUMENTS

| | | |
|---|---|---|
| DE | 19539535 | 4/1997 |
| EP | 0365005 | 10/1989 |

* cited by examiner

METHOD AND APPARATUS FOR THE SONIC DETECTION OF HIGH PRESSURE CONDITIONS IN A VACUUM SWITCHING DEVICE

BACKGROUND OF THE INVENTION

1. Field of the Invention

This invention relates to detection of failure conditions in high power electrical switching devices, particularly to the detection of high pressure conditions in a vacuum interrupter through the use of sonic transducers.

2. Description of the Related Art

The reliability of the North American power grid has come under critical scrutiny in the past few years, particularly as demand for electrical power by consumers and industry has increased. Failure of a single component in the grid can cause catastrophic power outages that cascade throughout the system. One of the essential components utilized in the power grid are the mechanical switches used to turn on and off the flow of high current, high voltage AC power. Although semiconductor devices are making some progress in this application, the combination of very high voltages and currents still make the mechanical switch the preferred device for this application.

There are basically two configurations for these high power mechanical switches; oil filled and vacuum. The oil filled switch utilizes contacts immersed in a hydrocarbon based fluid having a high dielectric strength. This high dielectric strength is required to withstand the arcing potential at the switching contacts as they open to interrupt the circuit. Due to the high voltage service conditions, periodic replacement of the oil is required to avoid explosive gas formation that occurs during breakdown of the oil. The periodic service requires that the circuits be shut down, which can be inconvenient and expensive. The hydrocarbon oils can be toxic and can create serious environmental hazards if they are spilled into the environment. The other configuration utilizes a vacuum environment around the switching contacts. Arcing and damage to the switching contacts can be avoided if the pressure surrounding the switching contacts is low enough. Loss of vacuum in this type of interrupter will create serious arcing between the contacts as they switch the load, destroying the switch. In some applications, the vacuum interrupters are stationed on standby for long periods of time. A loss of vacuum may not be detected until they are placed into service, which results in immediate failure of the switch at a time when its most needed. It therefore would be of interest to know in advance if the vacuum within the interrupter is degrading, before a switch failure due to contact arcing occurs. Currently, these devices are packaged in a manner that makes inspection difficult and expensive. Inspection may require that power be removed from the circuit connected to the device, which may not be possible. It would be desirable to remotely measure the status of the pressure within the switch, so that no direct inspection is required. It would also be desirable to periodically monitor the pressure within the switch while the switch is in service and at operating potential.

It might seem that the simple measurement of pressure within the vacuum envelope of these interrupter devices would be adequately covered by devices of the prior art, but in reality, this is not the case. A main factor is that the switch is used for switching high AC voltages, with potentials between 7 and 100 kilovolts above ground. This makes application of prior art pressure measuring devices very difficult and expensive. Due to cost and safety constraints, complex high voltage isolation techniques of the prior art are not suitable. What is needed is a method and apparatus to safely and inexpensively measure a high pressure condition in a high voltage interrupter, preferably remote from the switch, and preferably while the switch is at operating potential. Additionally, it is desirable to have a method and apparatus that can be retrofitted to existing switching devices without extensive re-work or de-commissioning, and which does not require the vacuum interrupter module to be removed from the insulation and packaging of the switch housing.

FIG. 1 (Prior Art) is a cross sectional view 100 of a first example of a vacuum interrupter of the prior art. This particular unit is manufactured by Jennings Technology of San Jose, Calif. Contacts 102 and 104 are responsible for the switching function. A vacuum, usually below $10^{-4}$ torr, is present near the contacts in region 114 and within the envelope enclosed by cap 108, cap 110, bellows 112, and insulator sleeve 106. Bellows 112 allows movement of contact 104 relative to stationary contact 102, to make or break the electrical connection.

FIG. 2 (Prior Art) is a cross sectional view 200 of a second example of a vacuum interrupter of the prior art. This unit is also manufactured by Jennings Technology of San Jose, Calif. In this embodiment of the prior art, contacts 202 and 204 perform the switching function. A vacuum, usually below $10^{-4}$ torr, is present near the contacts in region 214 and within the envelope enclosed by cap 208, cap 210, bellows 212, and insulator sleeve 206. Bellows 212 allows movement of contact 202 relative to stationary contact 204, to make or break the electrical connection.

FIG. 3 (Prior Art) is a partial cutaway view of an example VBM (vacuum breaker module) 300 containing a vacuum interrupter 302. The VBM module 300 has an outer insulation covering 304 and an inner insulation layer 306 to isolate the high voltage being switched by the vacuum interrupter 302. Such modules are commonly used throughout the power generation and distribution system for switching purposes, and are manufactured by, for example, Joslyn High Voltage Company of Cleveland, Ohio.

FIG. 4 (Prior Art) is a cross sectional view of an example VSV (Versa-Vac) capacitor switching module 400 containing a vacuum interrupter 402. The VSV module 400 has an outer insulation covering 406 and an inner insulation layer 404 to isolate the high voltage being switched by the vacuum interrupter 402. Such modules are also commonly used throughout the power generation and distribution system for switching purposes, and are manufactured by, for example, Joslyn High Voltage Company of Cleveland, Ohio.

As can be seen from the configurations of modules 300 and 400, accommodating a modified interrupter 302 or 402 may require extensive design changes to the insulation layers and packaging. It would be desirable to have a pressure detection means that is able to determine the pressure inside interrupters 302 or 402 without extensive modification of the outer insulation and packaging, which would enable retrofit of the large number of switches currently operating in the field. This would improve the reliability of the power generation and distribution systems without the costly replacement of currently installed vacuum interrupters.

U.S. Pat. No. 3,983,345 discloses a method of detecting a leak in any one of the vacuum-type circuit interrupters of a high voltage vacuum circuit breaker comprising a plurality of normally series-connected interrupters located within a tank of the circuit breaker containing pressurized gas. Through small openings in the wall of the tank, a first set of conductive rods are inserted to make electrical connection with predetermined terminals of the interrupters. Through other small openings in the tank wall, a second set of conductive rods, insulated from the tank wall, are inserted to make electrical connection with predetermined other terminals of the interrupters. These predetermined terminals are such that the interrupters are connected electrically in parallel between the first and second sets of rods. Between said first and second sets of rods a test voltage is applied to the interrupters in parallel that is of sufficient value to produce a high probability of dielectric breakdown within any interrupter stressed by said voltage that has lost its vacuum, thus providing an indication of such a loss of vacuum.

U.S. Pat. No. 4,103,291 discloses a leak sensor powered directly by the circuit voltage being controlled by the vacuum circuit interrupter and continuously operating while the interrupter is in service. An indicating system is connected to the leak sensor, or sensors, and provides an indication of failure and corrective action to be taken in single phase or multi-phase circuits.

U.S. Pat. No. 4,163,130 discloses a vacuum interrupter with pressure monitoring means wherein a pair of separable electrodes are arranged within a highly evacuated envelope and are connected to a high voltage circuit provided with a vacuum pressure detector element which has a pair of detector electrodes insulated from each other and serving to detect the pressure of the vacuum within the evacuated envelope. The vacuum pressure detector element has a voltage applied thereto in such a manner that one of the detector electrodes is conductively connected to the one end of the evacuated envelope to which the high voltage circuit is connected and the other detector electrode is connected to ground potential through a series connection member consisting of different sorts of voltage allotment elements which are selected from a resistance, an inductance, and a capacitor and whose voltage allotment ratio varies in dependence on frequency. A vacuum pressure detector means detects the operation of the vacuum pressure detector element.

U.S. Pat. No. 4,270,091 discloses a partial pressure gauge utilizes an efficient electron collision excitation source yielding de-excitation radiation characteristic of residual gases. The intensity of a given spectral line is proportional to the partial pressure of the gas having such spectral line, and the current drawn from the excitation source provides a measure of the total pressure. A calibration technique based upon comparing the emitted light intensity with the ion currents associated with the excitation process yields an accurate measure of the relative partial pressure. Use of a filter to selectively pass radiation from a known constituent in known proportion in ambient gas provides an indication of the presence of a leak without the need for probing with a test gas. Provision for passing an evaporant stream through the excitation region permits accurate monitoring of the evaporant flux from which deposition rate is determined. In combination with techniques for achieving high differential sensitivity to fluctuations in light output from a selected spectral line, a novel leak detector is achieved. In combination with an optically dispersive element a residual gas analyzer is obtained.

U.S. Pat. No. 4,402,224 discloses a monitoring device for monitoring vacuum pressure of an electrical device employing an evacuated envelope. The patent discloses, particularly, a pressure responsive monitoring device which comprises an electric field generating device of vacuum type, an electric field detector means including a light source for generating light, an electric field detector detecting change of the electric field of the electric field generator due to the change of vacuum pressure inside the envelope and controlling the light depending upon the change of the electric field, and photoelectric converter for converting the light controlled by the electric field detector to an electric signal which is employed to monitor the vacuum pressure of the envelope.

U.S. Pat. No. 4,403,124 discloses a vacuum circuit interrupter which utilizes the vapor deposition shields thereof in the existing high voltage source or network which is controlled by the circuit interrupter to produce a cold cathode ion detector for determining the quality or amount of vacuum within the vacuum circuit interrupter. The central shield support ring which protrudes through the insulating casing of the circuit interrupter is used to supply ion current to a current detecting bridge through a circumferentially insulated surge resistor and from there to the common terminal of the aforementioned voltage source to thereby return one of the plates of the ion detecting device to the voltage source.

U.S. Pat. No. 4,440,995 discloses a vacuum circuit interrupter which utilizes the vapor deposition shields thereof and the existing high voltage electrical source or network which is controlled by the circuit interrupter to produce a cold cathode detector for determining the quality or amount of vacuum within the vacuum circuit interrupter. The central shield support ring which protrudes through the insulating casing of the circuit interrupter is utilized to supply electrical current to a current measuring device and to return one of the shields of the cold cathode detector to the common terminal of the aforementioned voltage source.

U.S. Pat. No. 4,491,704 discloses a vacuum monitoring device for use in vacuum circuit interrupters comprising a stacked resistor assembly as a voltage divider coupled to an internal shield of the vacuum bottle and a low voltage detection circuit for monitoring leakage currents under abnormal pressure conditions.

U.S. Pat. No. 4,937,698 discloses a system for foreseeing deterioration in interrupting a performance of a vacuum interrupter, including a first measuring component for measuring potentials of electric lines connected to fixed and movable electrodes of the vacuum interrupter; a second measuring component for measuring a potential of an arc shield; a signal transmitting section for the transmission of potential signals resulting from the measurements in the first and second-measuring component; a comparing section for making a comparison between the measured signal from the first measuring component and the measured signal from the second measuring component both transmitted through the signal transmitting section; and a judging section for judging that the fixed and movable electrodes have been deteriorated in their interrupting performance, on the basis of the result of the comparison made in the comparing section.

U.S. Pat. No. 5,286,933 discloses a vacuum circuit-breaker including, for each phase, at least one vacuum bottle housed inside a closed enclosure, wherein said circuit-breaker includes at least one scintillation fiber disposed in the space between said enclosure and the outside surface of the vacuum bottle(s), said fiber being connected outside the circuit-breaker to an opto-electronic device.

SUMMARY OF THE INVENTION

It is an object of the present invention to provide a method for determining a high pressure condition within an electrical device, including transmitting an excitation sonic signal, through a sonic wave guide, into the electrical device; receiving a response sonic signal from the electrical device, through the sonic wave guide, subsequent to transmission of the excitation sonic signal; determining a pressure within the electrical device by comparing the response sonic signal to a reference signal; and, issuing an alarm signal if the pressure within the electrical device is above a predetermined value.

It is another object of the present invention to provide an apparatus for detecting a high pressure condition within an electrical device, including a sonic wave guide having proximal and distal ends, the sonic wave guide having a first surface at the proximal end, the sonic wave guide having a second surface, at the distal end, the first surface having an area greater than the second surface, and the second surface being sonically coupled to the electrical device; a sonic transmitting device sonically coupled to the first surface; and, a sonic receiving device sonically coupled to the first surface.

BRIEF DESCRIPTION OF THE DRAWINGS

The present invention will be better understood when consideration is given to the following detailed description thereof. Such description makes reference to the annexed drawings, wherein.

DETAILED DESCRIPTION OF THE PREFERRED EMBODIMENTS

Figure 1:
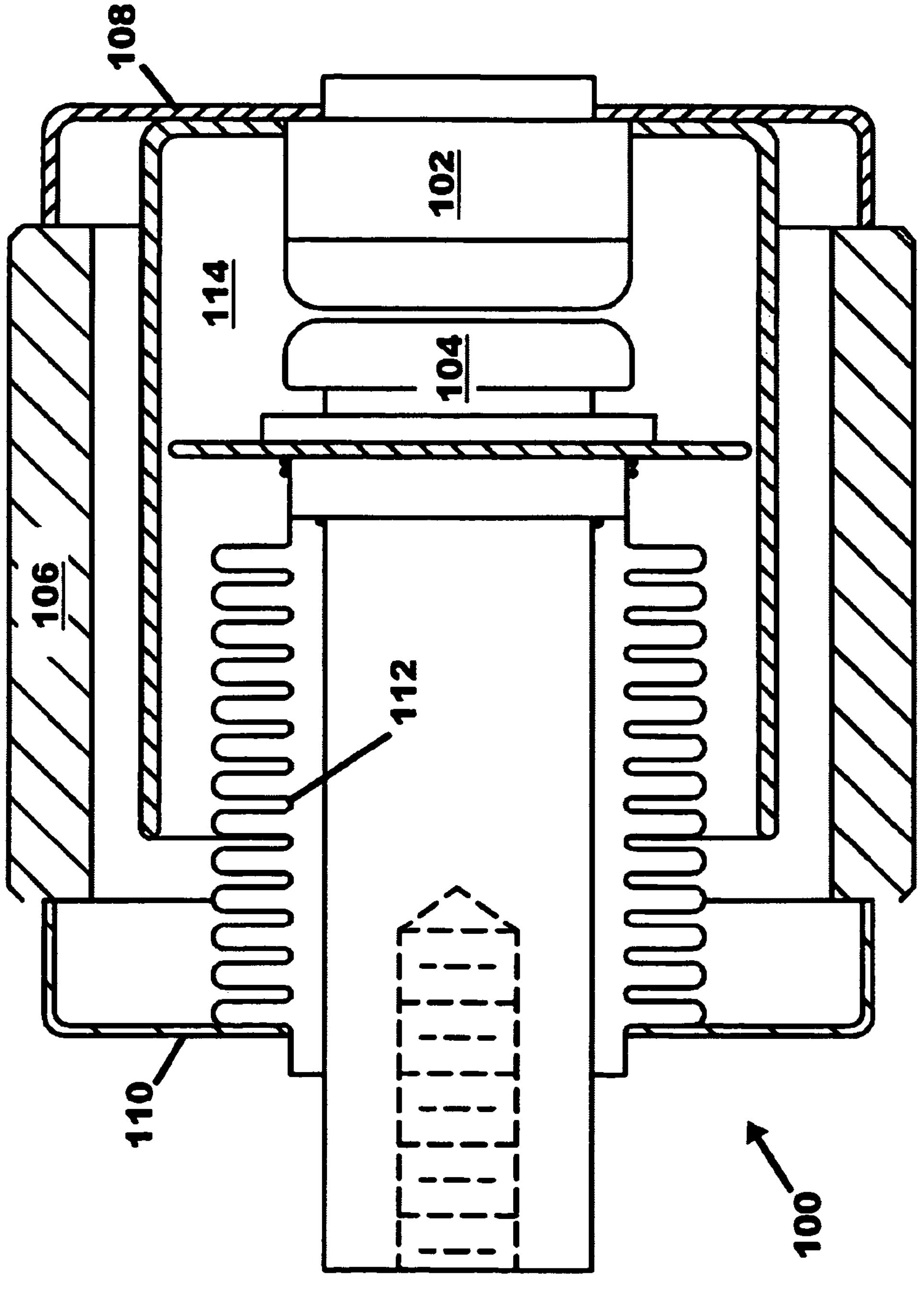
Fig. 1 Prior Art
FIG. 1 (Prior Art) is a cross sectional view of a first example of a vacuum interrupter.
Figure 2:
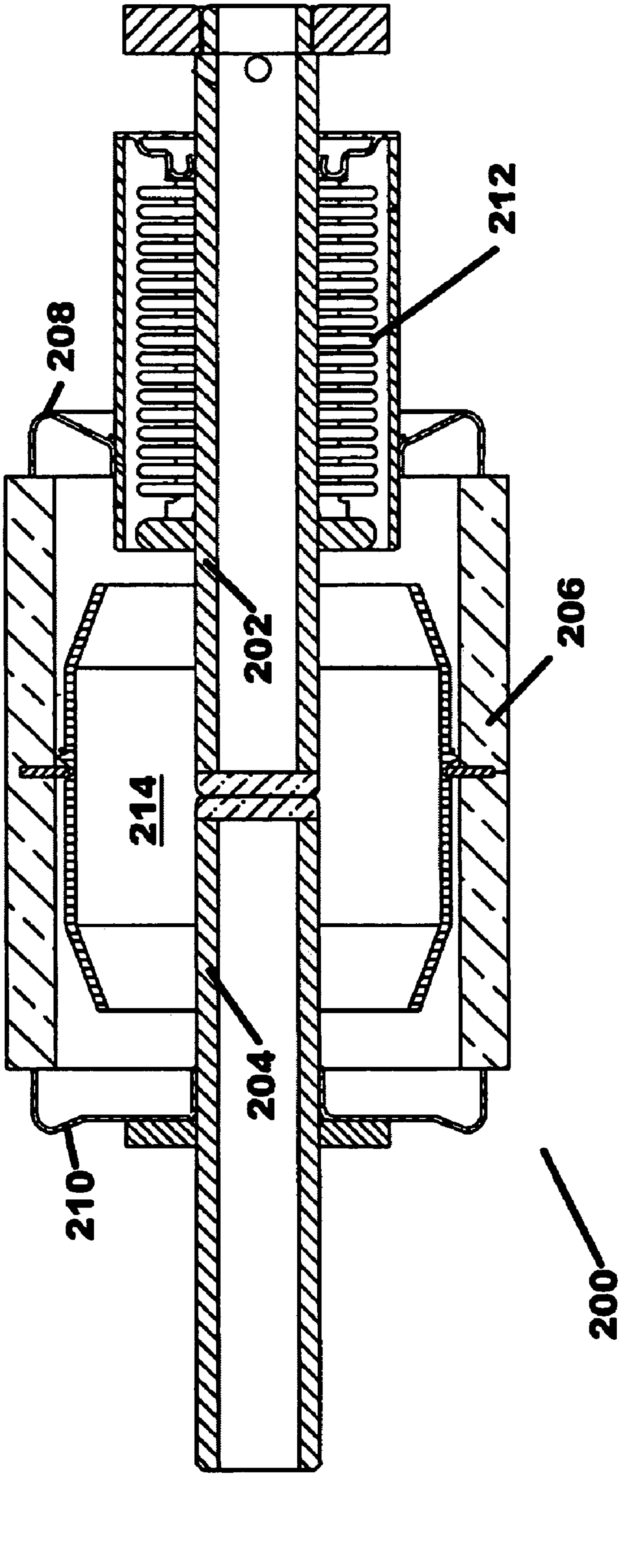
Fig. 2 Prior Art
FIG. 2 (Prior Art) is a cross sectional view of a second example of a vacuum interrupter.
Figure 3:
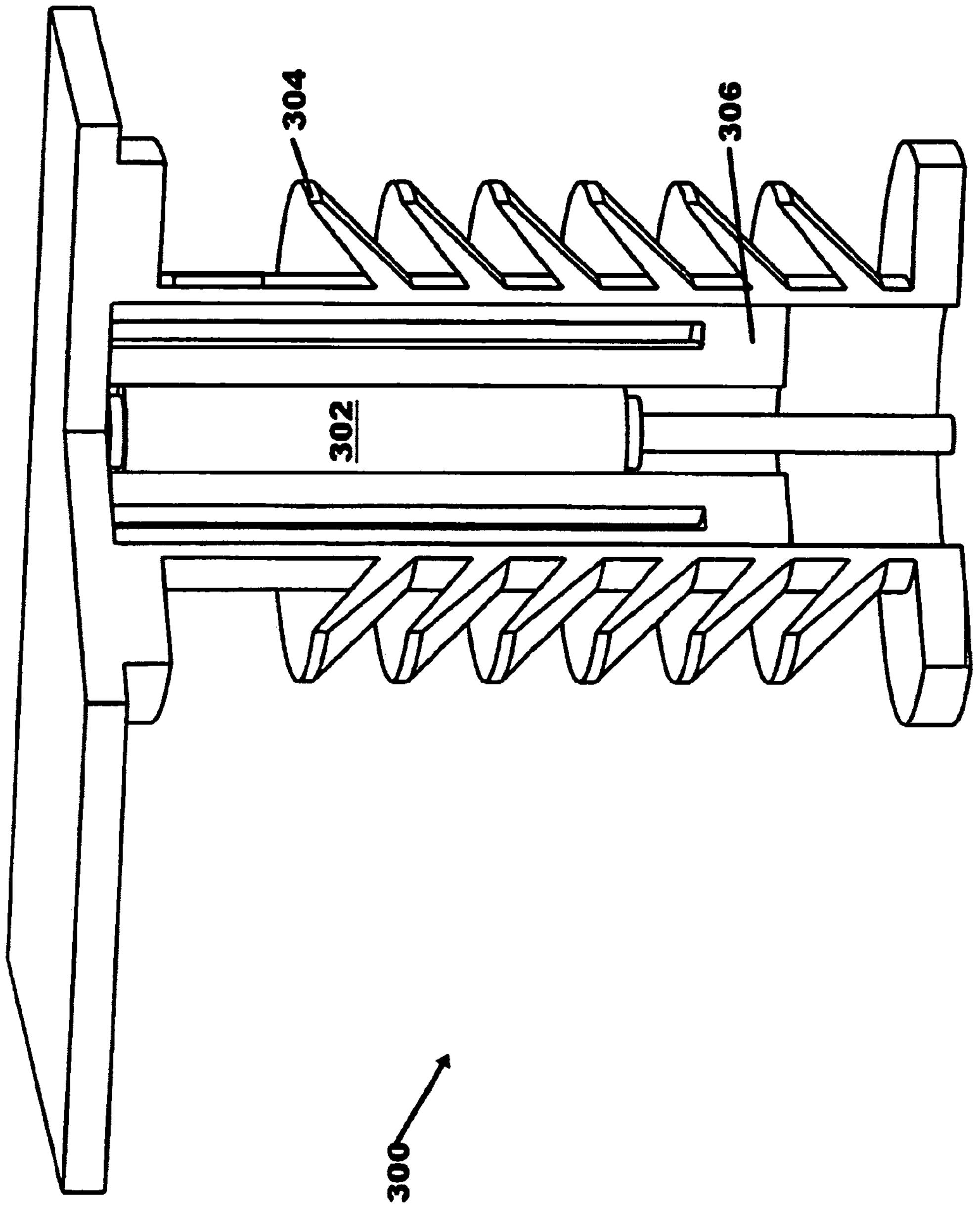
Figure 3 (Prior Art)
FIG. 3 (Prior Art) is a partial cutaway view of an example VBM (vacuum breaker module) containing a vacuum interrupter.
Figure 4:
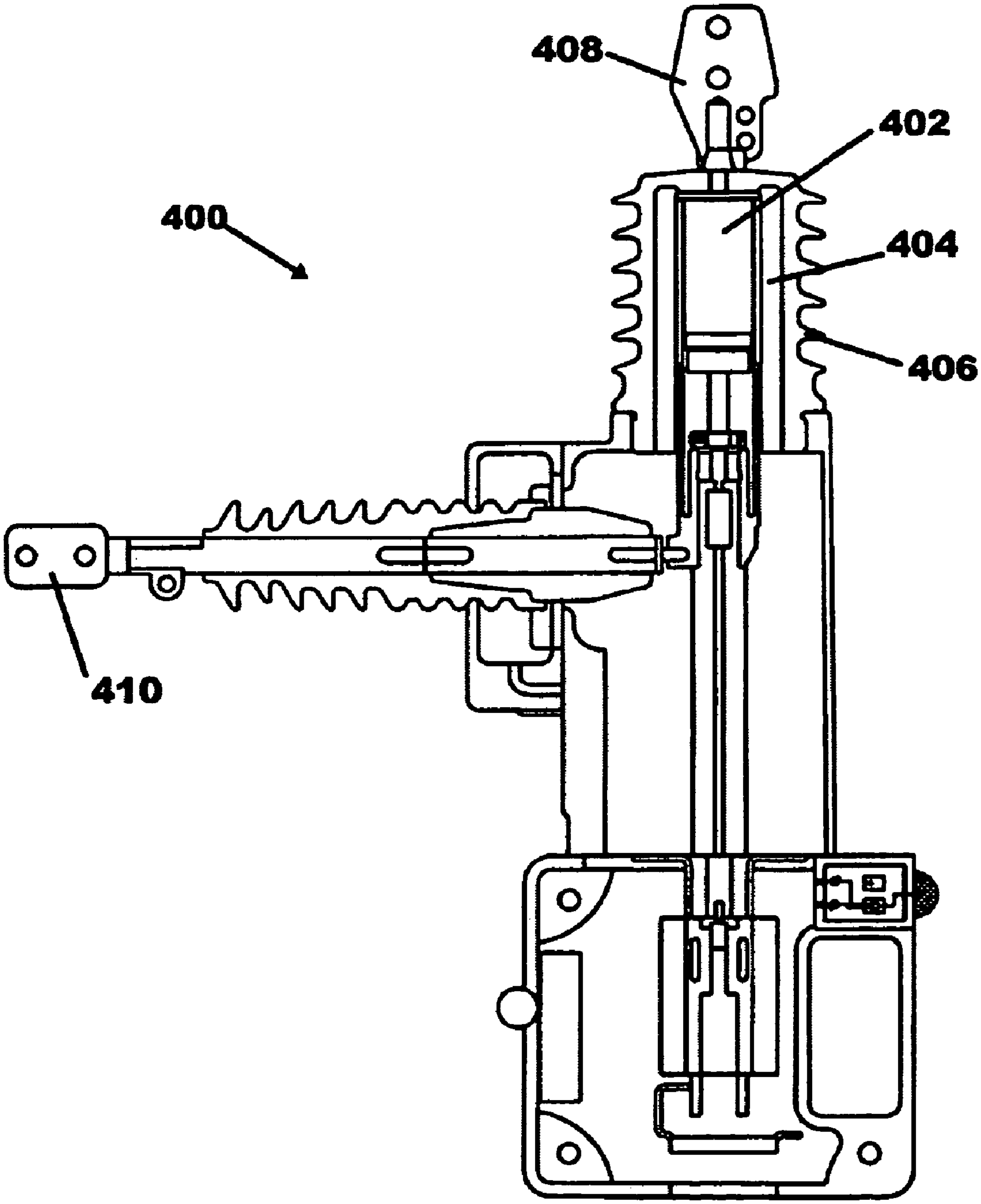
Figure 4 (Prior Art)
FIG. 4 (Prior Art) is a cross sectional view of an example VSV (VersaVac) capacitor switching module containing a vacuum interrupter.

The present invention is directed toward providing methods and apparatus for the measurement of pressure within a high voltage, high current vacuum interrupter. As examples, various embodiments described subsequently are employed with or within the configurations shown in FIGS. 1-4 (prior art). This by no means implies that the inventive embodiments are limited in application to these interrupter configurations only, as the illustrated embodiments of the present invention are equally applicable to any similar device such as, for example high voltage vacuum capacitors.

Many pressure measurement schemes disclosed in the prior art require electrical measurements referenced to the power line being switched by the interrupter. For lines at ground potential, this is acceptable. However, for many applications the lines are at many thousands of volts above ground potential, which makes isolation of measurement signals very difficult. Additionally, most prior art measurement schemes are not retrofit-able to existing interrupters, particularly those packaged within insulating housings. The present invention seeks to resolve the aforementioned difficulties unresolved by the prior art, by providing a pressure sensing device having an inherent high voltage isolation capability, which is retrofit-able to packaged interrupters already in service.

The present invention operates on the principle that structures within the vacuum interrupter will respond to sonic excitation in a manner dependent on the gas pressure within the interrupter. Anecdotally, this has been observed by striking a interrupter (as in, for example FIGS. 1 and 2 of the prior art) on its external shell with a hard object and listening to the sound resulting from the blow. An interrupter having a high gas pressure will sound differently than an interrupter under vacuum. However, it is not practical (or safe) to determine the internal pressure condition of interrupters operating at high voltage by whacking them with hammers. There are electronic transducers commonly available that contain a sound transmitter and receiver combination in the same package that could be attached to the outer surface of the interrupter. These transducers are used in commercial sonar applications such as “fish finders”, wherein the transmitter emits a burst of ultrasonic sound waves (a “ping”), then the receiver listens for reflected sound signals to determine the size and distance of objects in the water. However, the simple attachment of such devices to the external surface of vacuum interrupters has been found to yield unsatisfactory results, for a number of reasons. Firstly, the high voltage isolation requirement is generally beyond the capability of these commercial sonar transducers. Secondly, the curved surfaces of the interrupters and switching modules are not compatible with the generally flat surfaces of the sonic transducers. Thirdly, the transmitted sound intensity of the transducer transmitters coupled with the sensitivity of the transducer receivers has been found to be insufficient to distinguish pressure levels within the interrupter to an adequate degree.

The embodiments of the present invention provide a novel solution to the aforementioned problems or interfacing a sonar transducer to the interrupter. This solution entails the inclusion of a sonic wave guide device between the sonar transducer and the interrupter or switching module. The sonic wave guide serves a number of purposes. One, it insulates the sonar transducer from the high operating voltage of the interrupter. Two, it serves to adapt the flat sonar transducer surface to the curved surface to the interrupter or switching module. Three, it serves to amplify the excitation signal from the sonar transducer to the interrupter, as well as provide a sonic conduit for the reflected response signals from the interrupter to the receiver.

Figure 5:
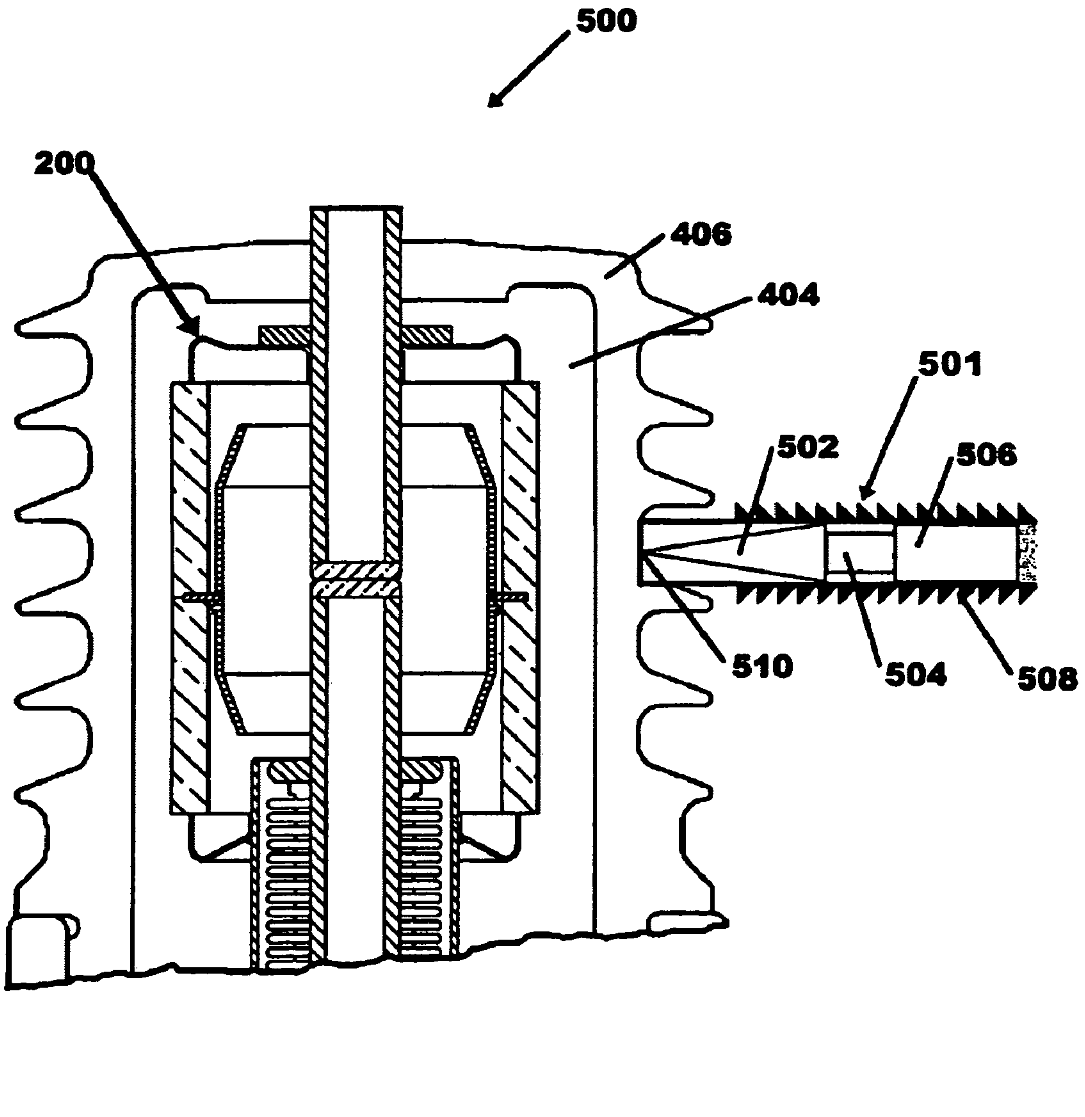
FIG. 5 is a partial cross sectional cut away view of an interrupter switching module containing a sonic pressure sensor attached to the outer insulation according to an embodiment of the present invention.

FIG. 5 is a partial cross sectional cut away view of an interrupter switching module 500 containing a sonic pressure sensor 501 attached to the outer insulation 406 according to an embodiment of the present invention. Vacuum interrupter 200 is housed within inner insulation layer 404 and outer insulation layer 406. Outer insulation layer 406 is generally a hard glass or ceramic material. Inner insulation material 404 is generally a foam type insulation. In this embodiment, sonic pressure sensor 501 is attached to the outer insulation layer 406, and comprises sonic wave guide 502, sonar transmitter/receiver module 504, interface electronics module 506, and protective case 508. Sonic pressure sensor 501 injects high intensity sound into the outer insulation layer 406 via a transmitter in module 504 coupled to sonic wave guide 502, which contacts insulation layer 406 at point 510. Sound is transmitted through layers 406 and 404 into the vacuum interrupter 200, where various mechanical structures within interrupter 200 reflect portions of the transmitted sonic signal back to sonic wave guide 502, which conducts the signal to a receiver in module 504. See the discussion below regarding FIGS. 11, 12 for further information on the sonic wave guide 502. Generally, the transmitted (or "excitation" signal) is produced during a first time period, then terminated. The receiver in module 504 then "listens" for the response signals during a second time period, immediately following termination of the first time period. The amplitude and timing of the reflected sonic response signals will depend on the gas pressure within the interrupter 200. High gas pressure facilitates the transmission of sound, whereas in deep vacuum, sound transmission ceases. At high gas pressures, the transmitted sonic signal reaches more structural components within the interrupter at a higher intensity, producing a larger number of reflected sonic signals at higher amplitude. At low gas pressures, the reflected signals are fewer in number and of lower amplitude. By analyzing the reflected sonic spectra, the pressure within the interrupter 200 is determined. For example, sonic spectra can be collected for a series of interrupters at known pressures, and stored electronically as reference spectra. Comparison of actual spectra with the stored reference spectra yields the pressure within the interrupter.

The aforementioned process generally utilizes a transmitted signal of constant frequency. Alternatively, the transmitted sonic signal can be varied in frequency, exciting resonance in various structures inside the interrupter. The magnitude and frequency of the response signals will be affected by gas pressure, as this will impact the resonance behavior of vibrating mechanical structures within the interrupter. In this mode, the receiver is "tuned" to the same frequency as the transmitted signal, which is being "swept" from one end of a predetermined range to the other. Methods for varying the transmitted signal frequency and tuning the receiver are well known to those skilled in the art.

For either method, the frequency range of the transmitted signal is between 20 kilocycles/second and 5000 kilocycles/second, preferably between 80 kilocycles/second and 200 kilocycles/second.

Interface electronics module 506 may have a number of functions. First, it supplies power to the transmit/receive module 504. The power may be derived from induction with the AC main power line connected to interrupter switching module 500. This can occur when sufficient current is flowing through the contacts in the interrupter, producing strong magnetic fields which will induce current in coils resident in module 506. This induced power can be used to drive the circuitry in modules 506 and 504 directly, or to charge storage devices within module 506 such as batteries and capacitors. The storage devices are necessary when the interrupter is only used on an intermittent basis. In this embodiment, the sonic pressure sensor 501 is attached to the outer insulator 406, so there is less concern about isolating any voltages being supplied to or extracted from module 506. As a result, power may also be supplied to module 506 from an external source (not shown). Secondly, interface module 506 may include analog amplification and drive circuitry for interfacing the transmit and receive transducers in transmit/receive module 504, as well as microprocessors or other digital circuitry necessary for interpreting the received sonic signals. Thirdly, module 506 includes any interface circuitry necessary for communicating the pressure status of the interrupter to remotely located monitoring stations or systems (not shown). This communication may be accomplished through conventional wired systems (not shown) such as RS-232, Ethernet, twisted pair, etc.; fiber optic cable (not shown); or RF transmitters (not shown) as is known in the art of RF ID systems. Alternatively, some or all of the functions described above for module 506 can be performed by a remotely located package, connected to the sonic pressure sensor 501 by any convenient means.

An advantage of the present invention is that low cost monitoring of numerous interrupters is possible, providing the pressure status of numerous interrupters within entire switching networks. Continuous pressure monitoring allows for preventative maintenance planning, providing for orderly and proactive action to replace potentially defective interrupters before they fail in a catastrophic manner.

Figure 6:
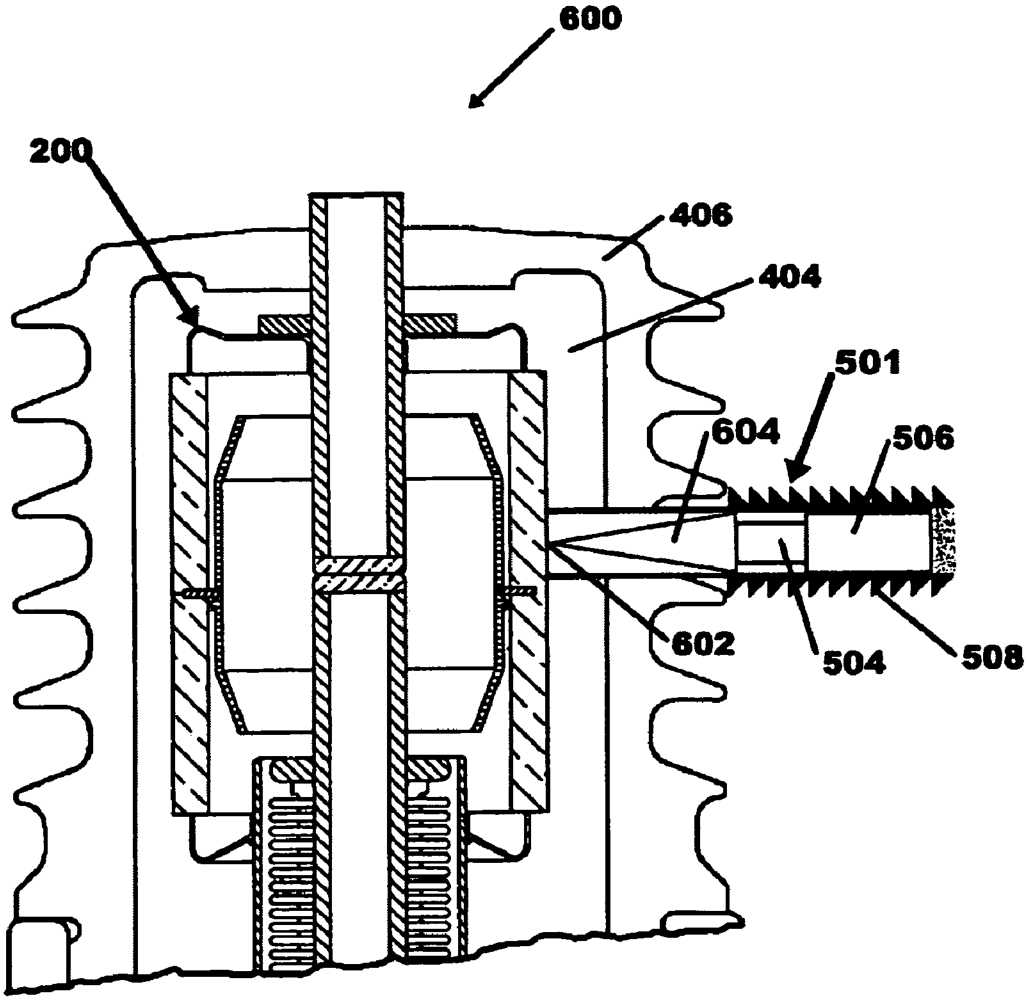
FIG. 6 is a partial cross sectional cut away view of an interrupter switching module containing a sonic pressure sensor attached to the interrupter according to an embodiment of the present invention.

FIG. 6 is a partial cross sectional cut away view of an interrupter switching module 600 containing a sonic pressure sensor 501 attached to the interrupter 200 according to an embodiment of the present invention. In this embodiment, sonic pressure sensor 501 is attached to the outer wall of interrupter 200, and comprises electrically insulating sonic wave guide 604, sonar transmitter/receiver module 504, interface electronics module 506, and protective case 508. Sonic pressure sensor 501 injects high intensity sound into the outer wall of interrupter 200 via a transmitter in module 504 coupled to sonic wave guide 604, which contacts wall of interrupter 200 at point 602. Sound is transmitted into the vacuum interrupter 200, where various mechanical structures within interrupter 200 reflect portions of the transmitted sonic signal back to sonic wave guide 604, which conducts the signal to a receiver in module 504. See the discussion below regarding FIGS. 11, 12 for further information on the sonic wave guide 604.

Figure 7:
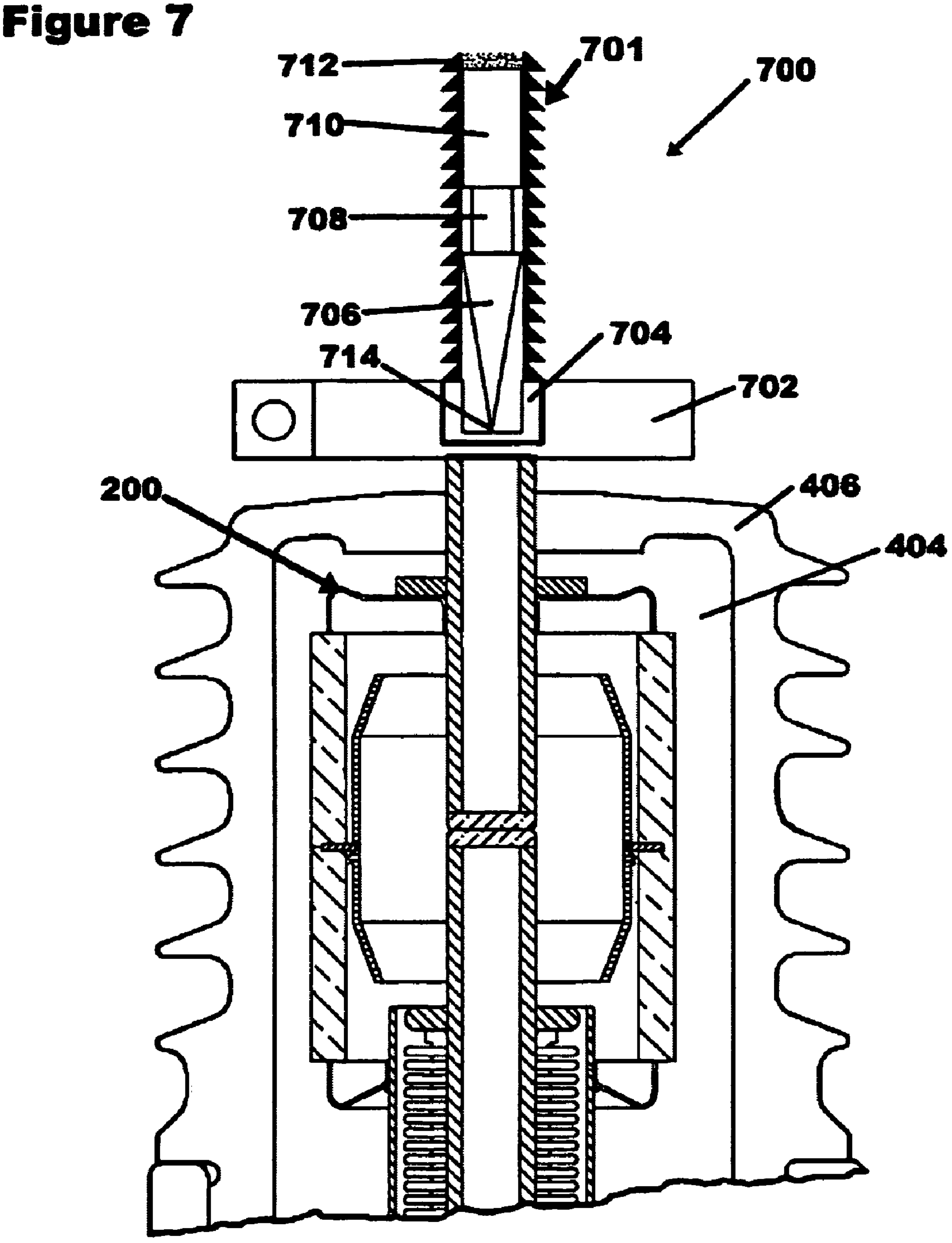
FIG. 7 is a partial cross sectional cut away view of an interrupter switching module containing a sonic pressure sensor attached to the upper power connector according to an embodiment of the present invention.

FIG. 7 is a partial cross sectional cut away view of an interrupter switching module 700 containing a sonic pressure sensor 701 attached to the upper power connector 702 according to an embodiment of the present invention. In this embodiment, sonic pressure sensor 701 is comprises sonic wave guide 706, sonar transmitter/receiver module 708, interface electronics module 710, and protective case 712. Sonic pressure sensor 701 injects high intensity sound into the upper power connector 702 via a transmitter in module 708 coupled to sonic wave guide 706, which contacts insulator 704 at point 714. Optionally, insulator 704 can be removed, placing an electrically insulating sonic wave guide 706 in direct contact with power connector 702. Sound is transmitted into the vacuum interrupter 200 through upper conductor 204 (see FIG. 2), where various mechanical structures within interrupter 200 reflect portions of the transmitted sonic signal back to sonic wave guide 706, which conducts the signal to a receiver in module 708. See the discussion below regarding FIGS. 11, 12 for further information on the sonic wave guide 706. Transmitter/receiver module 708 has a functionality similar to that of module 504 previously described. Interface electronics module 710 has a functionality similar to that of module 506 previously described.

Figure 8:
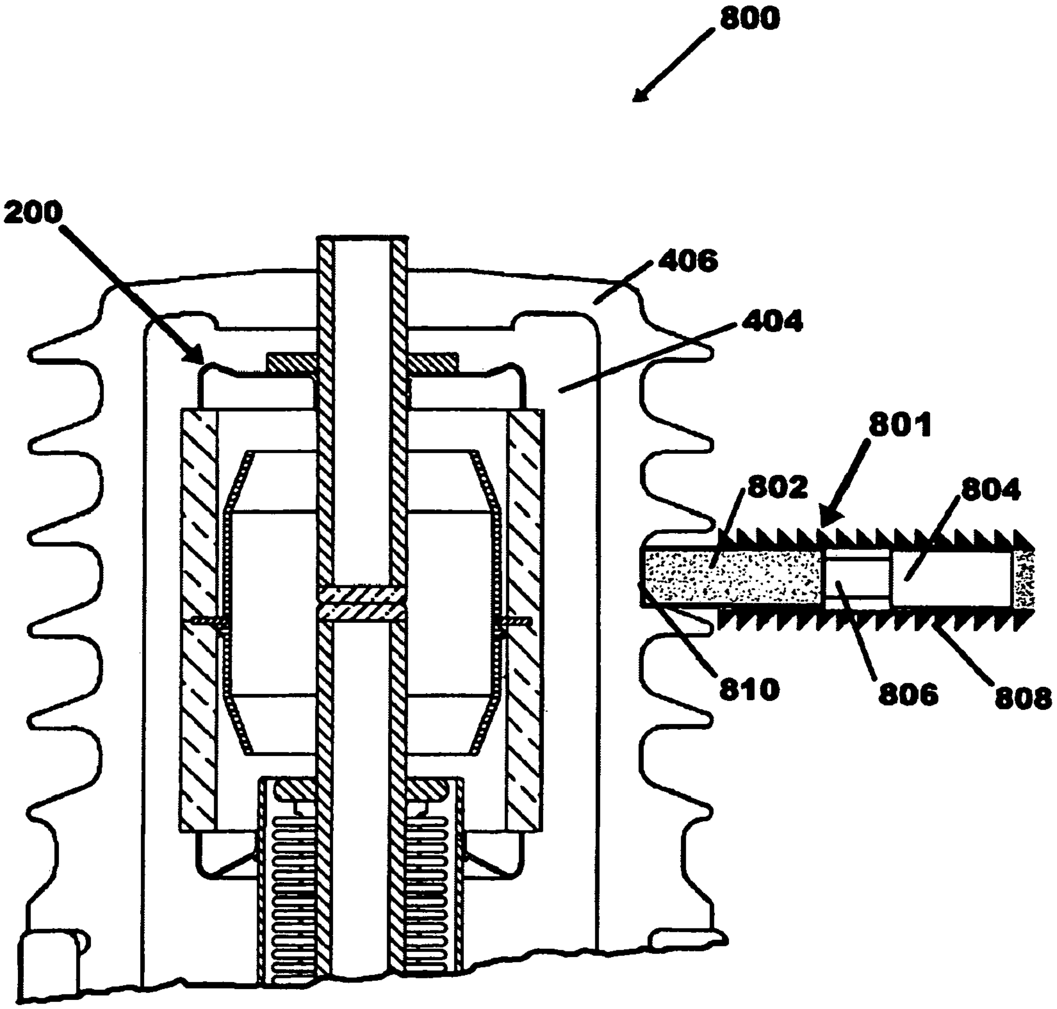
FIG. 8 is a partial cross sectional cut away view of an interrupter switching module containing a sonic pressure sensor having an alternative sonic wave guide shape attached to the outer insulation according to an embodiment of the present invention.

FIG. 8 is a partial cross sectional cut away view of an interrupter switching module 800 containing a sonic pressure sensor 801 having an alternative sonic wave guide shape attached to the outer insulation 406 according to an embodiment of the present invention. In this embodiment, sonic pressure sensor 801 is attached to the outer insulation layer 406, and comprises sonic wave guide 802, sonar transmitter/receiver module 806, interface electronics module 804, and protective case 808. See the discussion below regarding FIG. 10 for further information on the sonic wave guide 802. Instead of a "point" contact described in previous embodiments, the present embodiment discloses a "line contact" 810 of the sonic wave guide 802 with the outer surface of insulator 406. Sonic pressure sensor 801 operates in a manner similar to sonic pressure sensor 501, described in FIG. 5 above, wherein transmitter/receiver module 806 has a functionality similar to that of module 504, and interface electronics module 804 has a functionality similar to that of module 506 as previously described.

Figure 9:
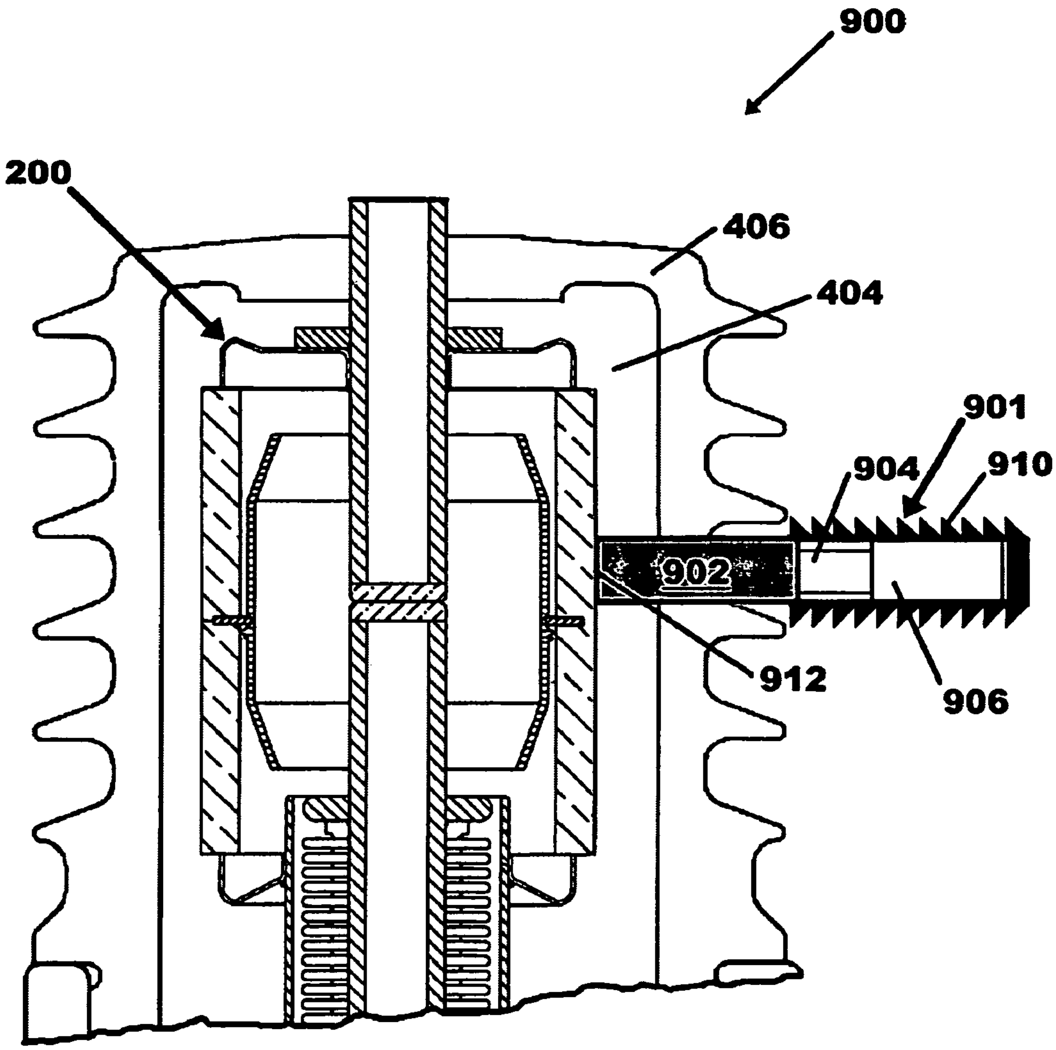
FIG. 9 is a partial cross sectional cut away view of an interrupter switching module containing a sonic pressure sensor having an alternative sonic wave guide shape attached to the interrupter according to an embodiment of the present invention.

FIG. 9 is a partial cross sectional cut away view of an interrupter switching module 900 containing a sonic pressure sensor 901 having an alternative sonic wave guide shape attached to the interrupter 200 according to an embodiment of the present invention. In this embodiment, sonic pressure sensor 901 is attached to the outer wall of interrupter 200, and comprises electrically insulating sonic wave guide 902, sonar transmitter/receiver module 904, interface electronics module 906, and protective case 908. Sonic pressure sensor 901 injects high intensity sound into the outer wall of interrupter 200 via a transmitter in module 904 coupled to sonic wave guide 902, which provides a "line" contact with the wall of interrupter 200 at 912. See the discussion below regarding FIG. 10 for further information on the sonic wave guide 902. Sonic pressure sensor 901 operates in a manner similar to sonic pressure sensor 501, described in FIG. 6 above, wherein transmitter/receiver module 904 has a functionality similar to that of module 504, and interface electronics module 906 has a functionality similar to that of module 506 as previously described.

The sonic wave guides serve a number of important and novel functions in embodiments of the present invention. Firstly, they adapt the generally flat, planar shapes of the sound emitting and receiving surfaces of commercial transducers to the curved, cylindrical outer surfaces of interrupters and interrupter switching modules. Attempting to attach the disk-like shapes of commercial transmit/receive transducers to the curved cylindrical surface of, for example, an interrupter, results in a small percentage of the transducer surface making contact with the interrupter. This in turn, can result in a small percentage of the transmitted sound energy being transferred to the interrupter, and poor sensitivity of the receiver to response signals being directed back. Secondly, the specific shape of the sonic wave guide amplifies the intensity of the sound being delivered to the interrupter. Thirdly, the material of construction may provide for electrical isolation between surfaces at high voltage (generally the interrupter or connectors thereon) and the transducers and other low voltage circuitry.

Figure 10:
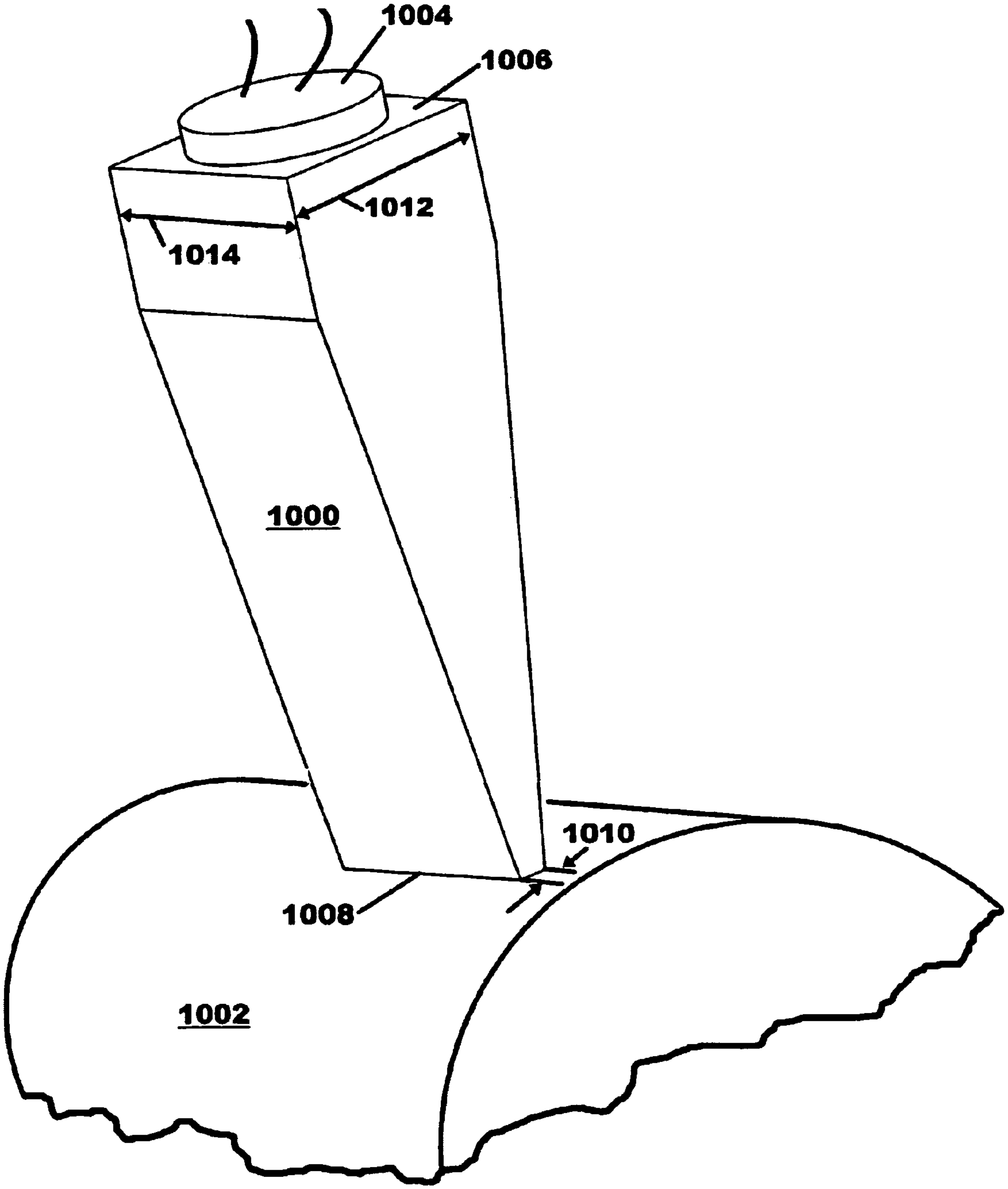
FIG. 10 is a pictorial view of a first example of a sonic wave guide in accordance with an embodiment of the present invention.

FIG. 10 is a pictorial view of a first example of a sonic wave guide 1000 in accordance with an embodiment of the present invention. In this embodiment, a commercial sonar transmit/receive module 1004 is attached to surface 1006 at a proximal end of sonic wave guide 1000. This module 1004 contains a sound transmitter device and a sound receiver device integrated into a single unit. These modules are commercially available and are well known to those skilled in the art. Alternatively, separate transmitter and receiver devices can also be used if both are mounted to surface 1006. Surface 1006 has a width of dimension 1012 and length of dimension 1014, which are sufficient to cover the mating surface of module 1004. Generally, the surface area of surface 1006 is designed to be as small as possible and still cover the transducer mating surface, to minimize losses and maximize sensitivity. Surface characteristics such as flatness, roughness, etc. are optimized to provide full contact with the module 1004 mating surface, in accordance with techniques well known to those skilled in the art. If necessary, an interface grease or compound can be placed between module 1004 and sonic wave guide 1000 to minimize interface losses and enhance sonic transmission. At distal end 1008, the sonic wave guide contact surface is reduced to a length dimension of 1014 and a width dimension of 1010, reducing the area of the contact surface significantly from that of surface 1006. This contact surface provides more of a "line contact" suitable for cylindrical surfaces such as 1002. The reduction in surface area from the proximal end (surface 1006) to distal end 1008 provides for the sonic amplification of sonic wave guide 1000, wherein the intensity of the sound emitted from the transmitter portion of module 1004 is increased at the contact surface (distal end). The sonic wave guide amplification allows increased sensitivity of the sonic transducers, and the detection of lower pressure levels.

Sonic wave guide 1000 is constructed of a rigid material having good sound transmission characteristics. This material includes, but is not limited to, rigid plastics, plastic composites, ceramics, quartz, glass, and combinations of the foregoing. For applications where high voltage isolation is required (such as FIGS. 6, 7, and 9), then a suitable dielectric material is required. It is useful to note that the sonic wave guide may be constructed of stratified or layered materials having specific shapes designed to enhance sound transmission (not shown). Each layer may have a specific shape and be composed of a different material, providing a sonic "lensing" or focusing effect to further amplify sound transmission within the sonic wave guide.

Figure 11:
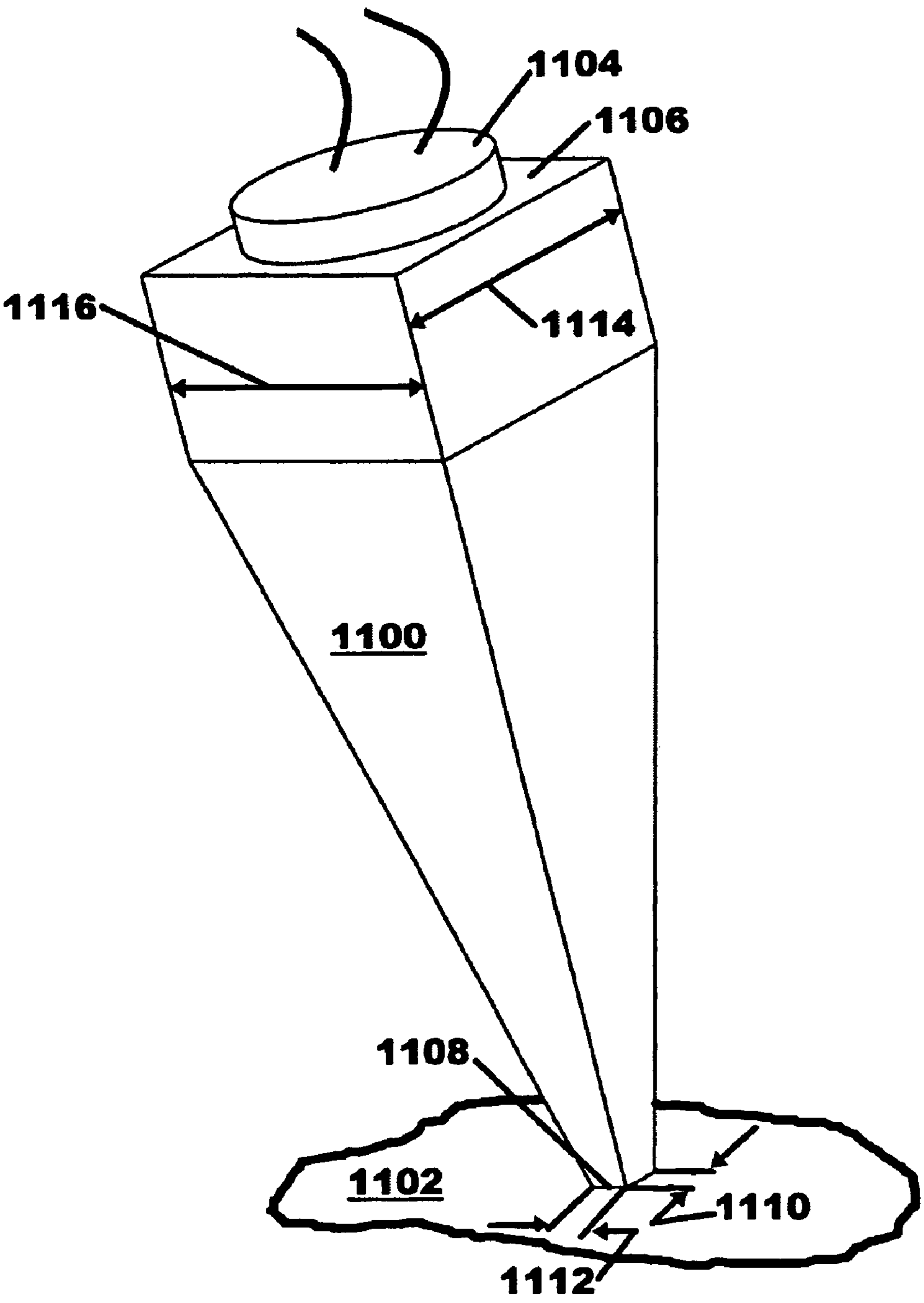
FIG. 11 is a pictorial view of a second example of a sonic wave guide in accordance with an embodiment of the present invention.

FIG. 11 is a pictorial view of a second example of a sonic wave guide 1100 in accordance with an embodiment of the present invention. Transmit/receiver module 1104 is attached to proximal end at surface 1106. Surface 1106 has a width of dimension 1114 and length of dimension 1116, which are sufficient to cover the mating surface of module 11104. At distal end 1108, the sonic wave guide contact surface is reduced to a length dimension of 1112 and a width dimension of 1110, reducing the area of the contact surface significantly from that of surface 1106. This provides a "point contact" on surface 1102 of significantly reduced surface area. The reduction in surface area from the proximal end (surface 1106) to distal end 1108 provides for the sonic amplification of sonic wave guide 1100, wherein the intensity of the sound emitted from the transmitter portion of module 1104 is increased at the contact surface (distal end).

Sonic wave guide 1100 is constructed of a rigid material having good sound transmission characteristics. This material includes, but is not limited to, rigid plastics, ceramics, glass, and combinations of the foregoing. For applications where high voltage isolation is required (such as FIGS. 6, 7, and 9), then a suitable dielectric material is required. It is useful to note that the sonic wave guide may be constructed of stratified or layered materials having specific shapes designed to enhance sound transmission (not shown). Each layer may have a specific shape and be composed of a different material, providing a sonic "lensing" or focusing effect to further amplify sound transmission within the sonic wave guide.

Figure 12:
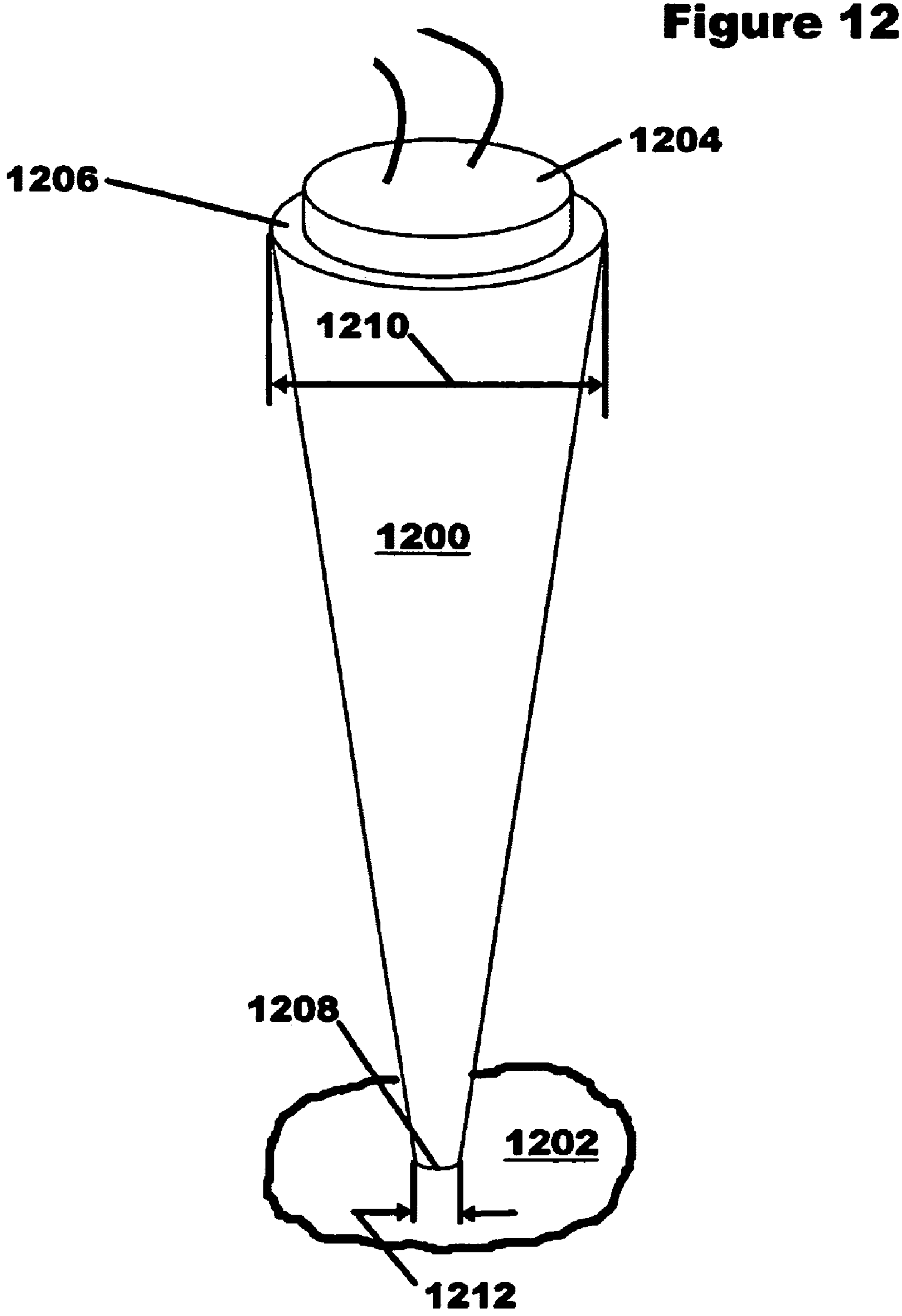
FIG. 12 is a pictorial view of a third example of a sonic wave guide in accordance with an embodiment of the present invention.

FIG. 12 is a pictorial view of a third example of a sonic wave guide 1200 in accordance with an embodiment of the present invention. Transmit/receiver module 1204 is attached to proximal end at surface 1206. Surface 1206 has a diameter dimension 1210, and is of a generally circular shape. At distal end 1208, the sonic wave guide contact surface is reduced to a diameter dimension of 1212. This provides a "point contact" on surface 1202 of significantly reduced surface area. The reduction in surface area from the proximal end (surface 1206) to distal end 1208 provides for the sonic amplification of sonic wave guide 1200, wherein the intensity of the sound emitted from the transmitter portion of module 1204 is increased at the contact surface (distal end).

Sonic wave guide 1200 is constructed of materials as described above in FIGS. 10 and 11.

It should be evident to those of ordinary skill in the art that the specific embodiments disclosed in FIGS. 10, 11, and 12 are merely examples, and that other geometries of the proximal and distal ends are also suitable. For example, a rectangular shaped proximal end surface can be combined with a circular or elliptical distal end surface, or vise versa. The important criteria required in all embodiments of the sonic wave guide is that the surface area at the proximal end (attached to the transmit/receiver module) is greater than the surface area at the distal end (attached to the interrupter or interrupter module). It should also be evident to one of ordinary skill in the art, that applications of the sonic pressure transducer described above can be broadened beyond the determination of pressures within interrupters, to the determination of pressures inside any enclosed vessel or device, to whose outer surface embodiments of the present invention can be attached.

Figure 13:
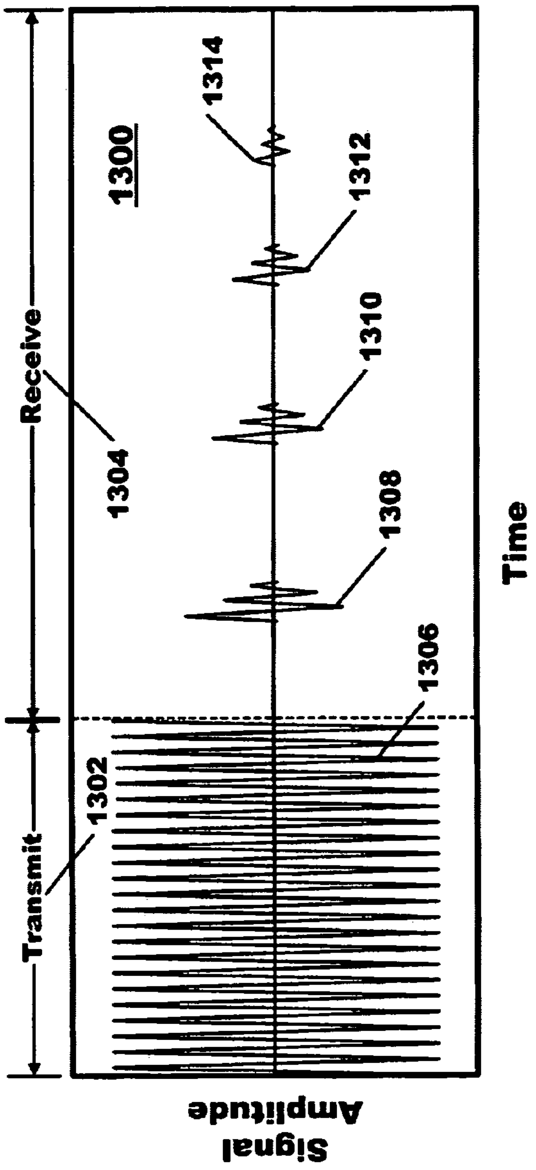
FIG. 13 is a chart of example transmit and receive signals for sonic pressure sensors measuring low pressure inside an interrupter, in accordance with an embodiment of the present invention.

FIG. 13 is a chart 1300 of example transmit 1306 and receive 1308-1314 signals for sonic pressure sensors measuring low pressure inside an interrupter, in accordance with an embodiment of the present invention. In chart 1300, the first time period labeled Transmit 1302 shows an example excitation or transmitted ultra-sound waveform broadcast from the transmit/receive module, through the sonic wave guide, into the interrupter. At the end of the Transmit 1302 time period, the transmitted signal is abruptly terminated, and the transmit/receive module "listens" for the sonic response signal during a subsequent time period labeled Receive 1304. Examples of the sonic response signal components are shown as items 1308-1314. At low pressures, these signal components will be fewer in number and of lower amplitude than those signal components received at higher pressures (see FIG. 14 below). Each particular interrupter configuration will have a unique set of sonic response signal components, which will also vary as a function of pressure within the device. Analysis of this sonic fingerprint determines the pressure level within the interrupter.

Figure 14:
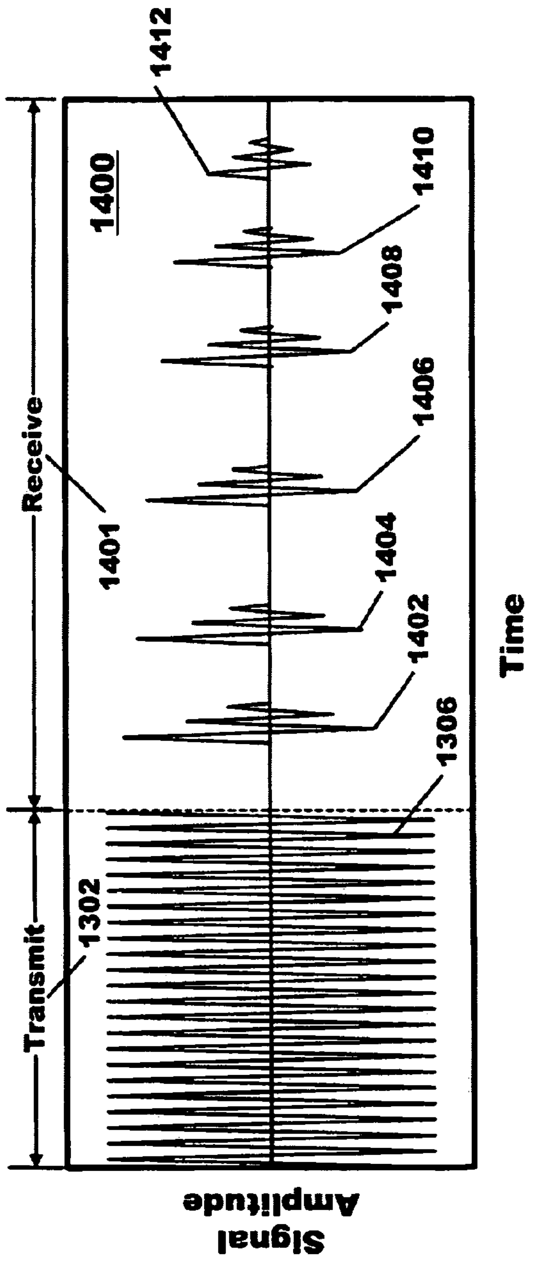
FIG. 14 is a chart of example transmit and receive signals for sonic pressure sensors measuring high pressure inside an interrupter, in accordance with an embodiment of the present invention.

FIG. 14 is a chart 1400 of example transmit 1306 and receive signal components 1402-1412 for sonic pressure sensors measuring high pressure inside an interrupter, in accordance with an embodiment of the present invention. At high pressure, there are considerably more response signal components 1402-1412 than the low pressure example of FIG. 13, and each signal is of generally higher amplitude.

Figure 15:
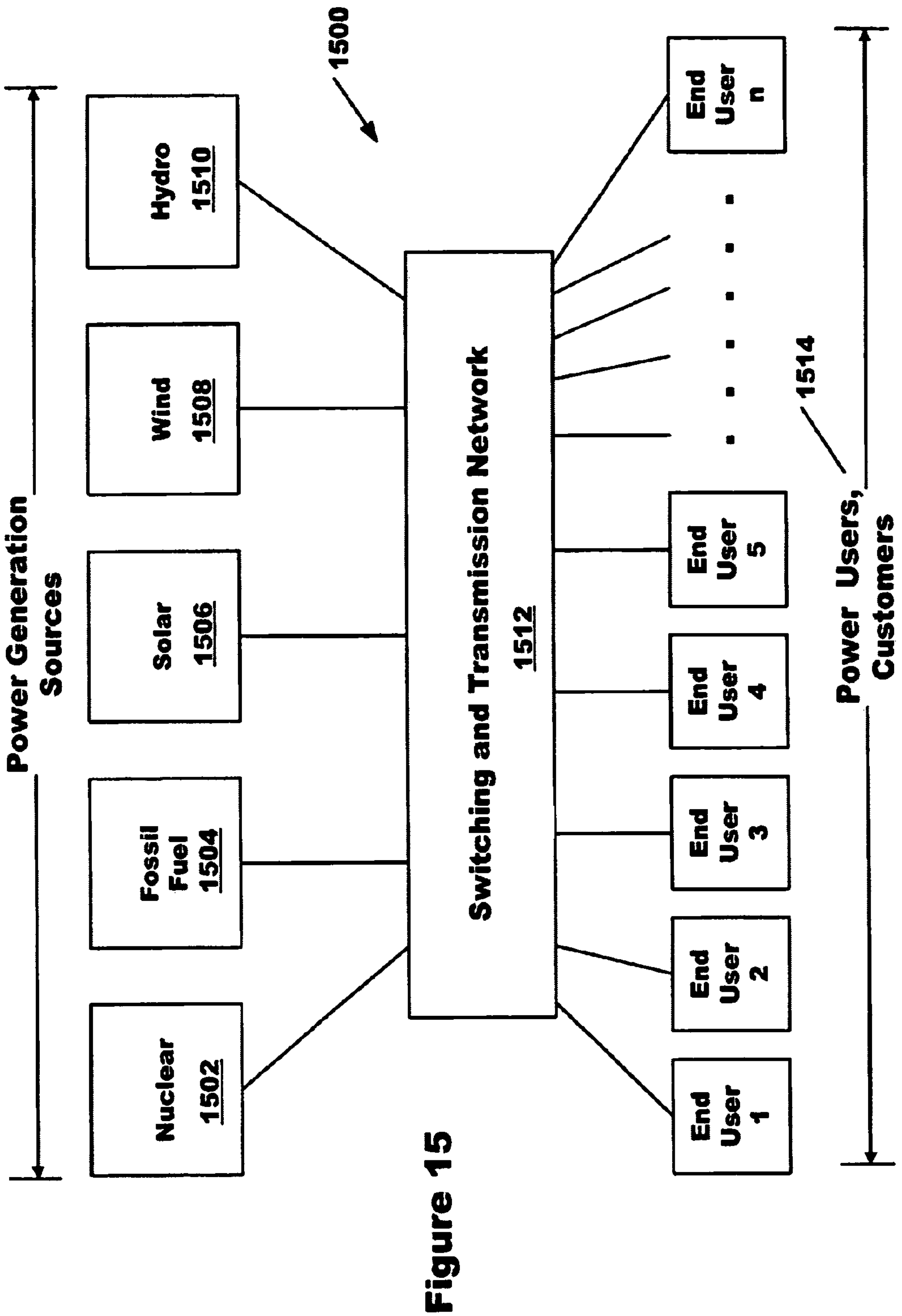
FIG. 15 is a block diagram of an electrical power generation and distribution system in accordance with an embodiment of the present invention.

FIG. 15 is a block diagram 1500 of an electrical power generation and distribution system in accordance with an embodiment of the present invention. This diagram is a simplified version of a complete power distribution network, but nevertheless will serve to illustrate the relevant features of the present invention. The diagram is divided into three main components; power generation sources 1502-1510, a switching and transmission network 1512, and a plurality of end users 1514. Each of these main components will have numerous interrupter switching modules employed within their structure (not shown for clarity). Example of electrical power generation sources include Nuclear 1502, Fossil Fuel (which includes coal, natural gas) 1504, Solar 1506, Wind power 1508, and Hydro electric 1510. Within these power generation sources, which represent complex electric generating facilities, there are numerous switching devices employed, at least a portion of which are vacuum interrupters. The switching and transmission network 1512 interfaces the power sources with the end customers 1514. By its very nature, network 1512 utilizes numerous switching devices, a significant number of which are vacuum interrupters. End users and customers 1514 may also employ power switching devices at their facilities.

Figure 16:
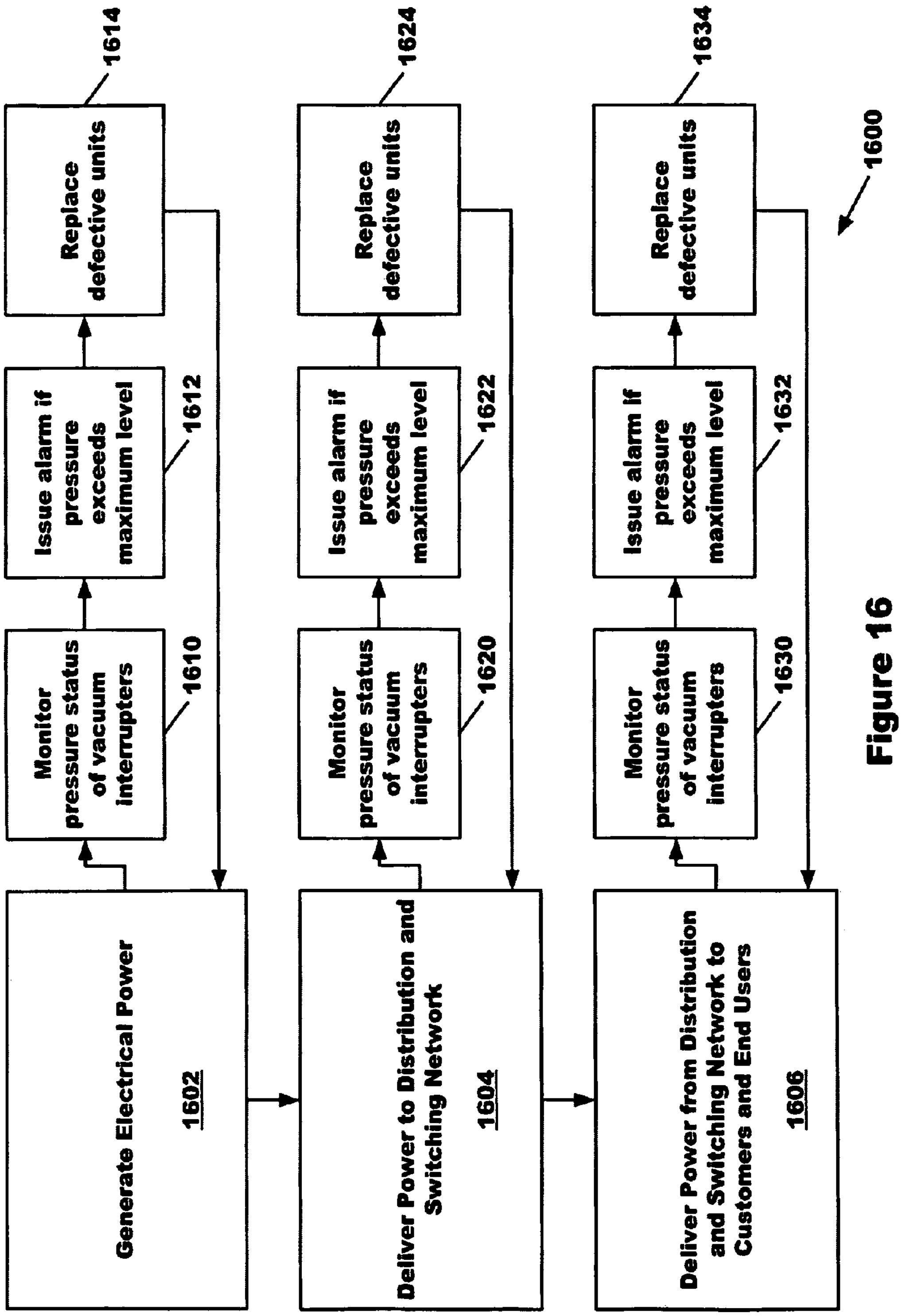
FIG. 16 is a block diagram of a method for generating and distributing electrical power in accordance with an embodiment of the present invention; and, FIG. 17 is a block diagram of a method for measuring interrupter pressure using sonic sensors in accordance with an embodiment of the present invention.

FIG. 16 is a block diagram 1600 of a method for generating and distributing electrical power in accordance with an embodiment of the present invention. In a first step 1602, electrical power is generated in a power generation facility. Sonic pressure sensors, attached to various vacuum interrupter modules present within the power generation facility, are monitored in step 1610. If the pressure in one or more interrupters exceeds a preset value, an alarm is issued in step 1612, and the defective interrupters are replaced in step 1614. In step 1604, the electrical power is delivered to the distribution and switching network. Sonic pressure sensors, attached to various vacuum interrupter modules present within the power distribution network, are monitored in step 1620. If the pressure in one or more interrupters exceeds a preset value, an alarm is issued in step 1622, and the defective interrupters are replaced in step 1624. In step 1606, power is delivered from the distribution and switching network to the end customers. Sonic pressure sensors, attached to various vacuum interrupter modules present within the end user facility, are monitored in step 1630. If the pressure in one or more interrupters exceeds a preset value, an alarm is issued in step 1632, and the defective interrupters are replaced in step 1634.

Figure 17:
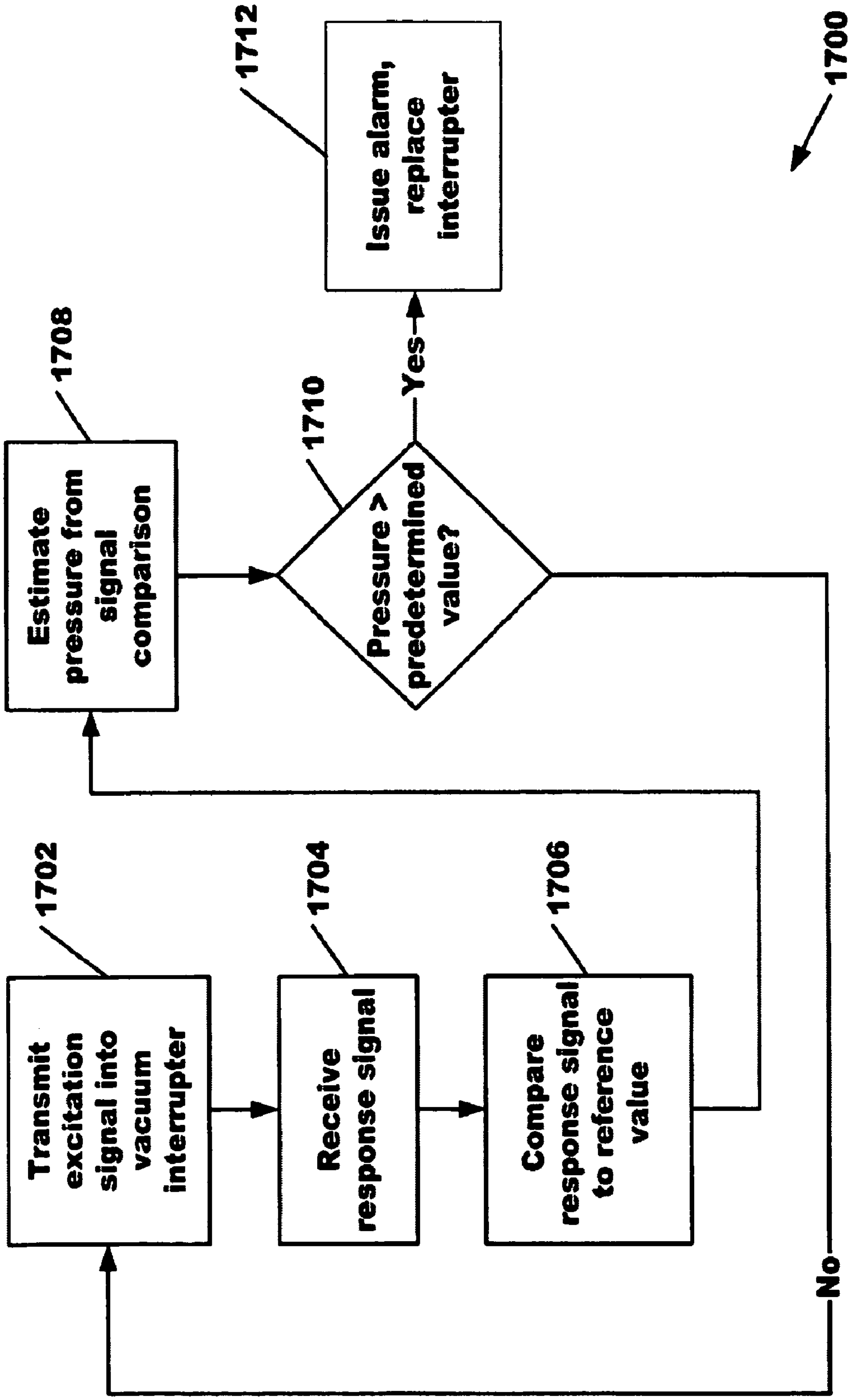

FIG. 17 is a block diagram 1700 of a method for measuring interrupter pressure using sonic sensors in accordance with an embodiment of the present invention. In step 1702, the excitation signal 1306 is transmitted into the vacuum interrupter. In step 1704, a response signal is received. In step 1706, the response signal is compared to one or more reference signals. In step 1708, the pressure within the interrupter is estimated from comparison of the response signal to the reference signal. In step 1710, the measured pressure is compared with a predetermined value. If the pressure is greater than the predetermined value, an alarm is issued in step 1712. If the pressure is less than the predetermined value, then monitoring continues and a new excitation signal is transmitted in step 1702.

The present invention is not limited by the previous embodiments or examples heretofore described. Rather, the scope of the present invention is to be defined by these descriptions taken together with the attached claims and their equivalents.

What is claimed is:

1. An apparatus for detecting a high pressure condition within a vacuum electrical device, the apparatus, comprising:

a sonic wave guide having proximal and distal ends, said sonic wave guide having a first surface at said proximal end, said sonic wave guide having a second surface at said distal end, said first surface having an area greater than said second surface, and said second surface being sonically coupled to said vacuum electrical device and having a shape that conforms to an outer surface of the vacuum electrical device;

a sonic transmitting device sonically coupled to said first surface at the proximal end of the sonic wave guide, the sonic transmitting device being configured to transmit an excitation sonic signal through the sonic wave guide into the vacuum electrical device while the vacuum electrical device is energized; and, a sonic receiving device sonically coupled to said first surface at the proximal end of the sonic wave guide, the sonic receiving device being configured to receive a response sonic signal from the vacuum electrical device through the sonic wave guide while the vacuum electrical device is energized.

2. An apparatus as recited in claim 1, wherein said sonic wave guide is made of an electrically insulating material.

3. An apparatus as recited in claim 2, wherein said sonic wave guide is made from one or more of rigid plastics, plastic composites, ceramics, quartz, and glass.

4. An apparatus as recited in claim 1, wherein said first surface and said second surface have a rectangular shape.

5. An apparatus as recited in claim 4, wherein said first surface and said second surface have a square shape.

6. An apparatus as recited in claim 1, wherein said first surface and said second surface have an elliptical shape.

7. An apparatus as recited in claim 6, wherein said first surface and said second surface have a circular shape.

8. An apparatus as recited in claim 1, wherein said vacuum electrical device is a vacuum interrupter enclosed within an electrical insulating layer and the outer surface is an outer surface of the electrical insulating layer.

9. An apparatus as recited in claim 1, wherein said sonic wave guide has an elongated shape.

10. An apparatus as recited in claim 1 further comprising an electronics interface module, said electronics interface module being electrically coupled to said sonic transmitting device and said sonic receiving device.

11. An apparatus as recited in claim 10, wherein said electronics interface module derives power from electrical current flowing through said vacuum electrical device, said electronics interface module supplying power to said sonic transmitting and said sonic receiving devices.

12. An apparatus as recited in claim 10, wherein said electronics interface module comprises communications means for transmitting a pressure status of said vacuum electrical device.

13. A method for determining a high pressure condition within a vacuum electrical device while the vacuum electrical device is energized, the method comprising:

transmitting an excitation sonic signal, through a sonic wave guide, into the vacuum electrical device while the vacuum electrical device is energized;

receiving, subsequent to transmission of the excitation sonic signal, a response sonic signal from said vacuum electrical device, through said sonic wave guide while the vacuum electrical device is energized;

determining a pressure within said vacuum electrical device by comparing said response sonic signal to a reference signal; and, issuing an alarm signal if said pressure within said vacuum electrical device is above a specified value.

14. A method as recited in claim 13, wherein said sonic wave guide comprises an elongated member having proximal and distal ends, said proximal end having a first surface, said distal end having a second surface, said first surface having a surface area greater than said second surface, and said second surface sonically coupled to said vacuum electrical device.

15. A method as recited in claim 14, wherein said excitation sonic signal is amplified when transmitted through said sonic wave guide.

16. A method as recited in claim 14, wherein said vacuum electrical device comprises a vacuum interrupter, enclosed within an electrical insulating layer having an outer surface, said second surface of said sonic wave guide being sonically coupled to said outer surface of said electrical insulating layer.

17. A method as recited in claim 14, wherein said vacuum electrical device comprises a vacuum interrupter having an outer surface, said second surface of said sonic wave guide being sonically coupled to said outer surface of said vacuum interrupter.

18. A method as recited in claim 13, wherein said transmitted excitation sonic signal is between 20 and 5000 kilocycles/second.

19. A method as recited in claim 18, wherein said transmitted excitation sonic signal is between 80 and 200 kilocycles/second.

20. A method as recited in claim 13, wherein comparing said response sonic signal to said reference signal further comprises comparing the number and amplitude of signal components of said response sonic signal to the number and amplitude of signal components of said reference signal.

21. A method as recited in claim 13, wherein determining said pressure within said electrical device comprises comparing said response signal to a reference signal.

22. A method for determining an alarm condition within a vacuum electrical device while the vacuum electrical device is operating at high voltage, the method comprising:

transmitting an excitation sonic signal into the vacuum electrical device through a sonic wave guide while the vacuum electrical device is operating at a voltage greater than 8 kilovolts;

receiving, subsequent to transmission of said excitation sonic signal, a response sonic signal from the vacuum electrical device through the sonic wave guide while the vacuum electrical device is operating at the voltage greater than 8 kilovolts;

comparing said response sonic signal to a reference; and, issuing an alarm signal if said comparison of said response sonic signal to said reference signal indicates a high pressure in the vacuum electrical device.

23. A method as recited in claim 22, wherein said transmitted excitation sonic signal is between 20 and 5000 kilocycles/second.

24. A method as recited in claim 22, wherein said transmitted excitation sonic signal is between 80 and 200 kilocycles/second.

25. A method as recited in claim 22, wherein said reference is a reference signal.

26. A method as recited in claim 25, wherein comparing said response sonic signal to said reference signal further comprises comparing the number and amplitude of signal components of said response sonic signal to the number and amplitude of signal components of said reference signal.

27. An apparatus for determining a high pressure condition within a vacuum electrical device, the apparatus comprising:

components for transmitting an excitation sonic signal, through a sonic wave guide, into the vacuum electrical device while the vacuum electrical device is energized;

components for receiving, subsequent to transmission of said excitation sonic signal, a response sonic signal from the vacuum electrical device while the vacuum electrical device is energized through said sonic wave guide;

components for determining a pressure within said vacuum electrical device based on said response sonic signal; and, components for issuing an alarm signal if said pressure within said vacuum electrical device is above a specified value.

28. The apparatus as recited in claim 27, wherein said sonic wave guide comprises an elongated member having proximal and distal ends, said proximal end having a first surface, said distal end having a second surface, said first surface having a surface area greater than said second surface, and said second surface sonically coupled to said vacuum electrical device.

29. The apparatus as recited in claim 28, wherein said excitation sonic signal is amplified when transmitted through said sonic wave guide.

30. The apparatus as recited in claim 28, wherein said vacuum electrical device comprises a vacuum interrupter enclosed within an electrical insulating layer having an outer surface, said second surface of said sonic wave guide being sonically coupled to said outer surface of said electrical insulating layer.

31. The apparatus as recited in claim 28, wherein said vacuum electrical device has an outer surface and said second surface of said sonic wave guide is sonically coupled to said outer surface of said vacuum electrical device.

32. The apparatus as recited in claim 27, wherein said transmitted excitation sonic signal is between 20 and 5000 kilocycles/second.

33. The apparatus as recited in claim 32, wherein said transmitted excitation sonic signal is between 80 and 200 kilocycles/second.

34. The apparatus as recited in claim 27, wherein said components for determining said pressure within the vacuum electrical device compare said response sonic signal to a reference signal.

35. The apparatus as recited in claim 34, wherein said components for determining said pressure within the vacuum electrical device compare the number and amplitude of signal components of said response sonic signal to the number and amplitude of signal components of said reference signal.

36. An apparatus for detecting a high pressure condition within a vacuum electrical device while the vacuum electrical device is operating at high voltage, comprising:

a sonic wave guide having proximal and distal ends, said sonic wave guide having a first surface at said proximal end, said sonic wave guide having a second surface at said distal end, said first surface having an area greater than said second surface, and said second surface being sonically coupled to the vacuum electrical device, the vacuum electrical device operating at a voltage greater than 8 kilovolts;

a sonic transmitting device sonically coupled to said first surface at the proximal end of the sonic wave guide, the sonic transmitting device being configured to transmit an excitation sonic signal through the sonic wave guide into the vacuum electrical device while the vacuum electrical device is operating at the voltage greater than 8 kilovolts; and, a sonic receiving device sonically coupled to said first surface at the proximal end of the sonic wave guide, the sonic receiving device being configured to receive a response sonic signal from the vacuum electrical device through the sonic wave guide while the vacuum electrical device is operating at the voltage greater than 8 kilovolts.

37. A method for determining a high pressure condition within a vacuum electrical device while the vacuum electrical device is operating at high voltage, comprising:

transmitting an excitation sonic signal, through a sonic wave guide, into the vacuum electrical device, while the vacuum electrical device is operating at a voltage greater than 8 kilovolts;

receiving, subsequent to transmission of said excitation sonic signal, a response sonic signal from the vacuum electrical device through said sonic wave guide while the vacuum electrical device is operating at the high voltage;

determining a pressure within said vacuum electrical device by comparing based on said response sonic signal to a reference signal; and, issuing an alarm signal if said pressure within said vacuum electrical device is above a specified value.

* * * * *